US006823893B2

(12) United States Patent
Hebmuller

(10) Patent No.: US 6,823,893 B2
(45) Date of Patent: Nov. 30, 2004

(54) NON-RETURN VALVE

(76) Inventor: Axel Hebmuller, Broicher Suite 17, Kaarst (DE), D-41564

( * ) Notice: Subject to any disclaimer, the term of this patent is extended or adjusted under 35 U.S.C. 154(b) by 0 days.

(21) Appl. No.: 10/318,186

(22) Filed: Dec. 13, 2002

(65) Prior Publication Data
US 2003/0131892 A1 Jul. 17, 2003

(30) Foreign Application Priority Data

Dec. 13, 2001 (DE) .......................... 101 61 462
Mar. 20, 2002 (DE) .......................... 202 04 430
Oct. 21, 2002 (DE) .......................... 202 16 210

(51) Int. Cl.[7] ............................................. F16K 15/02
(52) U.S. Cl. .................. 137/533.17; 137/534; 251/333; 251/368
(58) Field of Search ........................ 137/533, 533.17, 137/533.19, 534, 528, 469, 599.01, 601.2; 251/333, 368

(56) References Cited

U.S. PATENT DOCUMENTS

| 1,873,782 A | * | 8/1932 | Nixon ......................... 137/515 |
| 2,748,798 A | * | 6/1956 | Withrow ................ 137/533.17 |
| 2,959,188 A | * | 11/1960 | Kepner ....................... 137/540 |
| 3,099,999 A | * | 8/1963 | Vismara ................. 137/543.23 |
| 3,149,643 A | | 9/1964 | Breitsprecher |
| 3,189,046 A | * | 6/1965 | Callahan et al. ......... 137/515.7 |
| 3,670,766 A | * | 6/1972 | Tyson et al. ............. 137/515.5 |

FOREIGN PATENT DOCUMENTS

| DE | 1 450 483 | 12/1968 |
| DE | 1 500 026 | 5/1969 |

* cited by examiner

Primary Examiner—Ramesh Krishnamurthy
(74) Attorney, Agent, or Firm—Liniak, Berenato & White, LLC

(57) ABSTRACT

A non-return valve has a valve housing with a flow channel having a vertical channel section, an inlet aperture, an outlet aperture and a blocking device closing the flow channel. The blocking device comprises a valve seat surrounding the outlet aperture and a valve disc movable between an open position and a closed position. The valve disc is guided in the valve housing via a guide surface on its outer circumference, and comprises flow apertures radially outside its sealing surface. The valve disc possesses a diameter that becomes smaller towards the valve seat, forming an inclined external surface. Flow apertures start from the inclined external surface and converge in the direction facing away from the sealing surface, and are disposed in a uniform distribution over the circumference of the valve disc.

40 Claims, 5 Drawing Sheets

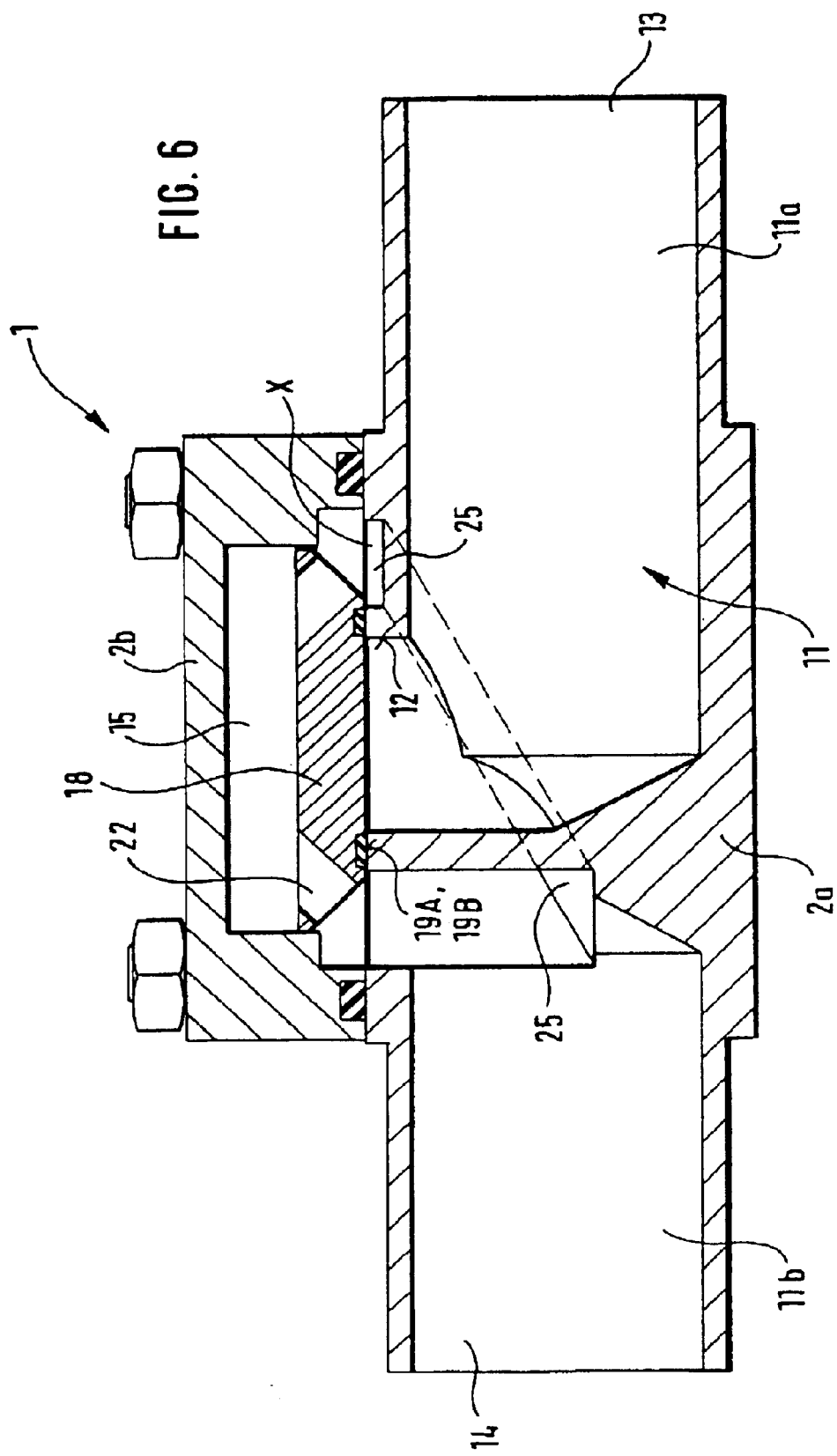

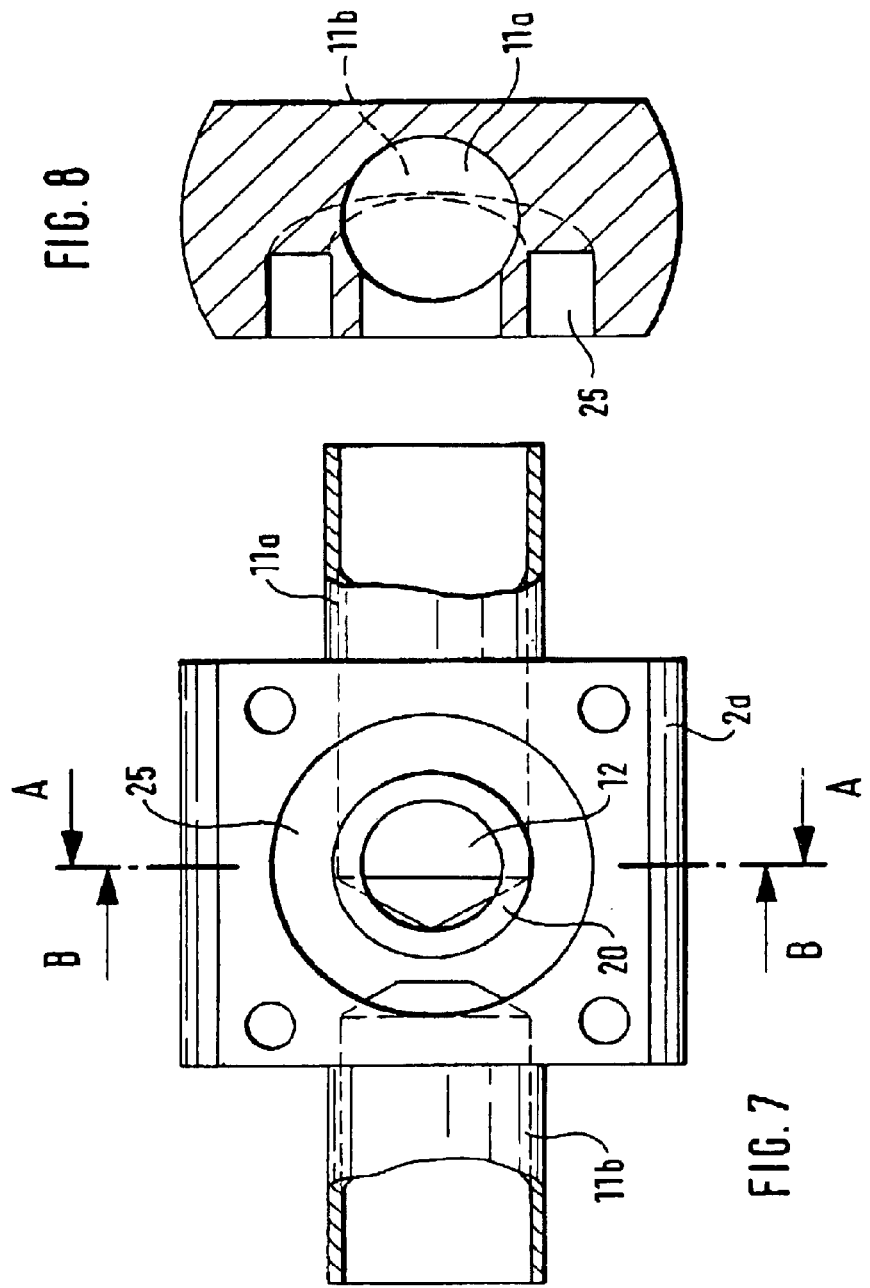

NON-RETURN VALVE

FIELD OF THE INVENTION

The present invention relates to non-return valve having a valve housing, in which is formed a flow channel which possesses a vertical channel section, having an inlet aperture and an outlet aperture and having a blocking device for closing the flow channel, which blocking device comprises a valve seat surrounding the outlet aperture of the vertical channel section and a valve disc, which is movable in the valve housing in the vertical direction between an open position and a closed position in which sealing surfaces on the valve disc and valve seat come into sealing contact, wherein the valve disc is movably guided in the valve housing via at least one guide surface provided on its outer circumference and comprises flow apertures radially outside its sealing surface.

BACKGROUND OF THE INVENTION

Non-return valves of this type are known in for example from DE-OS 14 50 483 and are fitted in fluid-carrying lines to ensure that a fluid in the line can flow only in one direction.

The conventional non-return valves have undoubtedly proved their value in practice. However, it is regarded as a partial problem that the conventional valve discs are complex in construction and, because of the large number of parts, have only limited suitability for "sterile" applications.

It is therefore an object of the invention to provide a non-return valve of the type specified initially which possesses a simple construction and guarantees a maximum level of sterility.

This object is achieved, according to the invention, in that the valve disc possesses a diameter that, starting from its guide surface, becomes smaller towards the valve seat, forming an inclined external surface, and that the flow apertures, which are formed as bores in the valve disc start from the inclined external surface and converge in the direction facing away from the sealing surface and are disposed in a uniform distribution over the circumference of the valve disc.

SUMMARY OF THE INVENTION

The valve with the inventive valve disc has a simple design and possesses a diameter that, starting from its guide surface, becomes smaller towards the bottom, forming an inclined external surface, in other words it tapers towards its underside. This measure not only permits a saving of weight but also improves the flow conditions for the fluid on opening of the valve, because it can more easily pass the valve disc to reach the flow apertures. For example, the valve disc can narrow conically downwards, starting from its guide surface, in which case the angle of the conical external surface to the horizontal is preferably approximately 45°. Alternatively, however, the external surface may also be of curved configuration, for example narrowing convexly downwards starting from the guide surface.

Since the flow apertures in the valve disc to start from the inclined external surface and converge obliquely upwards, in which case they are expediently inclined relative to the axis of the valve disc at an angle of from 30 to 60°, in particular 45°, the flow properties of the non-return valve can be optimized by these measures.

If a non-return valve is used in which the valve disc is movable in the valve housing between an upper, open position and a lower, closed position, the valve disc according to a preferred embodiment can be urged into its closed position by gravity alone, so that additional restoring means in the form of restoring springs or the like, such as are provided in the prior art, become superfluous and the number of components is thus further reduced.

If, in this embodiment, a fluid such as, for example, water flows through the non-return valve in operation, the valve disc is lifted in the vertical direction, when the incoming pressure is sufficiently high, so that the fluid can flow through the flow apertures of the valve disc. With increasing incoming pressure, the flow rate will also increase until the non-return valve is fully opened. During the opening process, the behaviour of the pressure and the opening of the valve are not necessarily in proportion but are stable. When the incoming pressure is reduced, the non-return valve closes. Backflow of the medium is thus avoided.

The level of incoming pressure under which the non-return valve according to the invention opens is essentially dependent on the weight of the valve disc and the prevailing force of gravity. As a rule, it is desirable for the valve to open and medium to be allowed through even at low incoming pressures of, for example, 0.02 bar.

According to an embodiment of the invention, provision is made for the guide surface to be formed on the upper edge region of the valve disc. In this case, the guide surface can form a continuous guide edge. This, however, is not absolutely necessary. For example, it is also possible for the flow apertures to be open towards the edge of the valve disc and for the guide surface thus to be interrupted by the flow apertures.

The flow apertures can, in principle, be of any desired configuration. In order to achieve the most uniform possible distribution of forces, according to a preferred embodiment, provision is made for the flow apertures to be disposed with a uniform distribution over the circumference of the valve disc. In this case, the flow apertures can be formed, for example, as bores, which are easy to produce.

The valve discs and valve seat can be formed to provide a metallic seal, in order words formed as appropriately smooth metal surfaces. According to a preferred embodiment, however, provision is made for one of the sealing surfaces to be formed on an elastic packing ring which is inserted, for example, into an annular groove on the underside of the valve disc. The packing ring may consist, for example, of rubber having a Shore hardness of 80.

In a further development of this embodiment, provision may be made for the packing ring to taper towards the sealing surface. In particular, the packing ring may possess a trapezoidal cross section, on whose short side the sealing surface is formed.

To ensure a high level of sterility, the valve disc and/or the valve housing is or are expediently produced from stainless steel, and the surfaces coming into contact with the fluid, especially the surface of the valve disc, may be polished, especially electropolished.

According to a preferred embodiment of the invention, the valve housing consists of a lower housing portion with the vertical channel section and the valve seat and an upper housing portion with a flow chamber which is open towards the underside and in which the valve disc is movably guided. The valve seat and the flow chamber thus lie, as it were, in the plane of separation of the valve housing and can be easily worked upon and installed.

In a conventional manner, the lower housing portion and the upper housing portion are releasably connected to one another and centred relative to one another. To produce the connection, connecting flanges having mutually corresponding through bores for connecting screws may be provided in a conventional manner on the housing portions.

The flow chamber naturally possesses a significantly larger diameter than the vertical channel section which is shut off by the valve disc, and a channel section adjoining the flow chamber at the top will also possess a significantly smaller diameter than the flow chamber. In this case, expediently, the transition region between the flow chamber and the channel section adjoining the latter at the top is configured to narrow conically, and the angle of the transition region to the horizontal should be from 30 to 60°.

Moreover, according to an advantageous embodiment of the invention, it is envisaged that the bottom of the flow chamber slopes down towards the valve seat at an angle of inclination of from 1.5 to 4°, especially 2°, starting from the wall on which the valve disc is guided. This ensures that no fluid can accumulate in the corner region between the flow chamber wall and the flow chamber bottom.

In a further embodiment of the invention, it is envisaged that an inlet channel section, particularly a horizontal inlet channel section, is formed in the lower housing portion and is connected to the flow chamber via the vertical channel section.

As an alternative to the embodiment described above, in which a channel section adjoins the flow chamber at the top, it is also possible to provide for an outlet channel section, in particular a horizontal outlet channel section, to be formed in the lower housing portion and to be connected via the flow chamber to the inlet channel section. In this embodiment, then, the inlet channel section and the outlet channel section of the non-return valve are formed in the lower housing portion and connected to one another via the flow chamber lying above them in the upper housing portion, in which flow chamber the valve disc is also disposed. In this case, the valve seat is formed, in part, on a housing partition separating the inlet channel section from the outlet channel section. Furthermore, an outflow channel surrounding the valve seat and open towards the outlet channel section may be formed between the lower housing portion and the upper housing portion, which outflow channel, in particular, is open at its upper side facing towards the flow chamber and possesses a depth that increases towards the outlet channel section, so that fluid in the outflow channel automatically flows down into the outlet channel section.

In the case of non-return valves in which the valve disc is movable vertically in the valve housing between a lower, open position and an upper, closed position, the valve disc may in principle be formed in the same manner as in the embodiments described above, with the proviso that in this case it is installed by a reversed installation procedure, in other words with the sealing surface facing upwards. Additional measures are necessary, however, to press the valve disc into its upper, closed position. For this purpose, it is possible, first, for the valve disc to be supported at its underside by a spring element which presses it into its closed position. Alternatively, the valve disc may consist of polytetrafluoroethylene (Teflon), in which case it is then pressed into its upper, closed position solely by the buoyancy of the fluid in the flow channel.

DESCRIPTION OF THE DRAWINGS

With regard to further advantageous embodiments of the invention, reference is made to the dependent claims and to the description of an example of embodiment that follows, with reference to the appended drawings, in which:

FIG. 6 shows a second embodiment of a non-return valve according to the invention in longitudinal section, FIG. 7 shows the non-return valve in accordance with FIG. 6 in a plan view with the upper housing portion removed, FIG. 8 shows the non-return valve in section along the line A—A in FIG. 7;

FIG. 9 shows the non-return valve in section along the line B—B in FIG. 7;

DETAILED DESCRIPTION OF THE PREFERRED EMBODIMENT(S)

Figure 1:
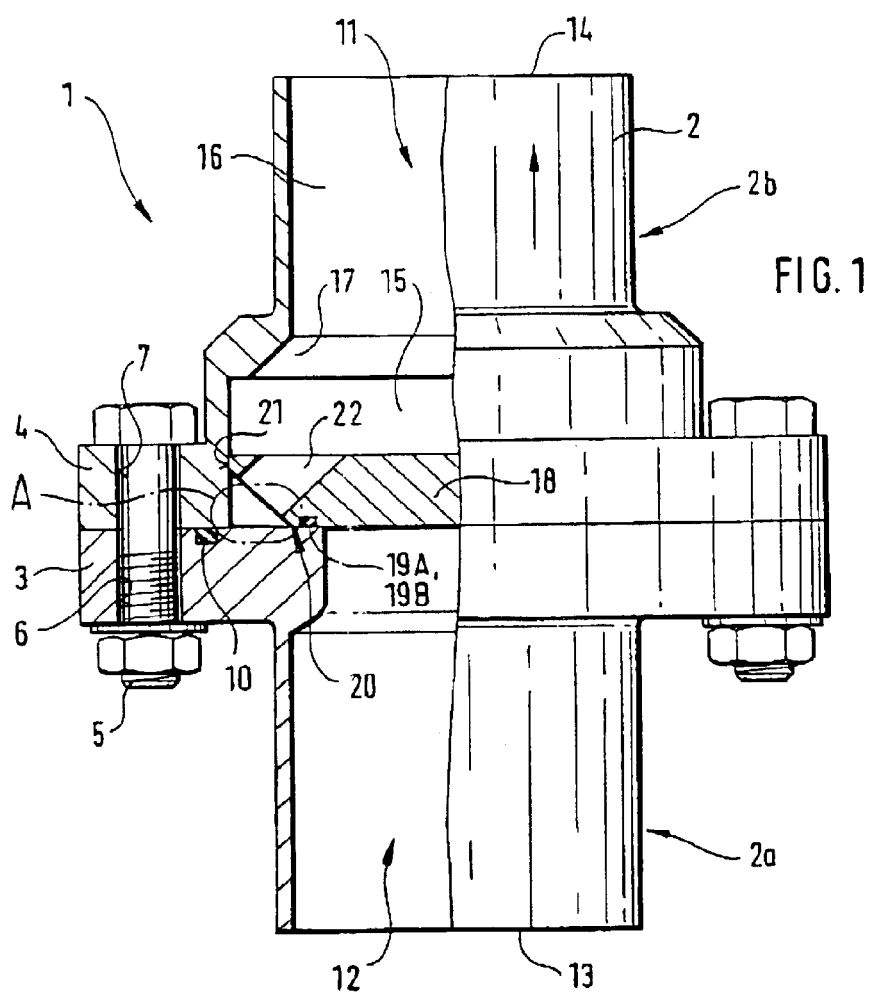
FIG. 1 shows a front view of a non-return valve according to the invention, half in longitudinal section.

FIG. 1 shows a non-return valve 1 according to the present invention which can be installed vertically, in the manner shown, in the piping of, for example, a WFI water system. The non-return valve 1 possesses a valve housing 2 made from stainless steel, which is essentially formed by a lower housing portion 2a and an upper housing portion 2b. The two housing portions 2a, 2b are screwed to one another. For this purpose, connecting flanges 3, 4 having mutually corresponding through bores 6, 7 for the connecting screws 5 are provided on the housing portions 2a, 2b in a manner known per se.

The two housing portions 2a, 2b are aligned to be centred relative to one another. For this purpose, a centring column (not shown) is provided on the lower housing portion 2a and a corresponding centring recess on the upper housing portion 2b. The gap between the housing portions 2a, 2b is sealed by packing ring 10.

A flow channel 11 is formed in the valve housing 2 and extends through the valve housing 2 in the vertical direction between an inlet aperture 13 in the underside of the housing and an outlet aperture 14 in the upper side of the housing.

The flow channel 11 encompasses a vertical channel section provided in the lower housing portion 2a, which vertical channel section comprises a flow chamber 15, which possesses a substantially greater diameter than the first channel section 12 and is formed between the housing portions 2a, 2b, and, adjoining the flow chamber 15, a second vertical channel section 16, the transition region 17 between the flow chamber 15 and the second channel section 16 sloping downwards at a 45° angle.

A valve disc 18 made from stainless steel is provided in the flow chamber 15 and is movable in the vertical direction between an upper, open position and a lower, closed position, in which sealing surfaces 19A, 19B on the valve disc 18 and on a valve seat 20, which is provided on the upper side of the lower housing portion 2a and surrounds the flow channel 11, come into sealing contact.

To guide the vertical movement, the upper edge region of the valve disc 18 is formed as a guide surface 21, which rests against the wall of the flow chamber 15, likewise formed as a guide surface.

Starting from the guide surface 21, the diameter of the valve disc 18 decreases continuously downwards as far as the region of its sealing surface 19a. In the embodiment shown in FIG. 1, the valve disc 18 narrows conically downwards, starting from the guide surface 21, the angle of the conical external surface 18A to the horizontal being approximately 45°. As an alternative, however, the external surface 18A may also be curved, for example narrowing convexly downwards in the manner shown in FIG. 2.

Figure 2:
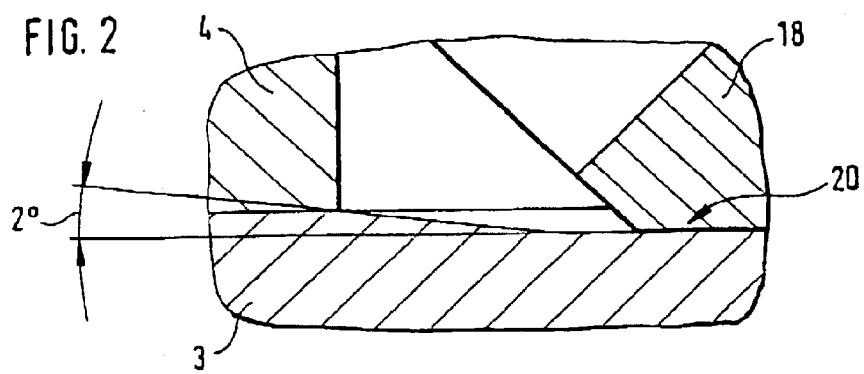
FIG. 2 shows the detail A from FIG. 1.

Along its circumference, the valve disc 18 comprises a plurality—in this case 12—of flow bores 22, which extend from the inclined external surface 18A of the valve disc 18 to the upper side thereof and—as is particularly clearly apparent in FIG. 2—converge towards one another upwards at an angle of 45° to the horizontal.

In the example of embodiment shown, the sealing surface 19A of the valve disc 18 is formed on a packing ring 24, which is injection-moulded into an annular groove 23 on the underside of the valve disc, so that cavities in which fluid might accumulate are avoided. The packing ring 24a consists in this case of rubber having a Shore hardness of 80 and possesses, on its part projecting from the annular groove 24, a trapezoidal projection whose short side forms the actual sealing surface 19A. The corresponding sealing surface 19B on the valve seat 20 is metallic.

FIG. 2 shows that the bottom of the flow chamber 15 declines at an angle of 2° towards the valve seat 20, starting from the chamber wall. The effect of this is to prevent fluid accumulating in the corner region between the wall and the bottom in operation.

In operation, the non-return valve 1 according to the invention is installed into a pipe in the vertical position shown in FIG. 1, so that the valve disc 18 lies on the valve seat 20 under its own weight and thus shuts off the flow channel 11. When a sufficiently high incoming pressure is present at the inlet aperture 13, the valve disc 18 is lifted out of the position shown in FIG. 1, so that fluid can flow from the channel section 12 into the flow chamber 15 and through the flow bores 22 to the second channel section 16. The higher the incoming pressure becomes, the further the valve disc 18 lifts away from the valve seat 20, the vertical movement being guided by the guiding contact between the flow chamber wall and the guide surface 21 on the upper edge region of the valve disc 18. When the incoming pressure falls again, the valve disc 18 is lowered again until it comes to rest on the valve seat 20 and again blocks off the flow channel 11.

FIGS. 6 to 9 show a second embodiment of a non-return valve 1 according to the present invention. Components of this non-return valve 1 which correspond to the components of the non-return valve 1 previously explained with reference to FIGS. 1 to 5 are designated by the same reference numerals.

The non-return valve 1 possesses a valve housing 2 which is formed by a lower housing portion 2a and an upper housing portion 2b screwed thereto. A flow channel 11 is formed in the valve housing 2 and extends through the valve housing 2 between an inlet aperture 13 and an outlet aperture 14. In contrast to the embodiment shown in FIG. 1, the flow channel 11 runs substantially horizontally and possesses a horizontal inlet channel section 11a formed in the lower housing portion 2a and connected at its outlet side via a vertical channel section 12 to the flow chamber 15 formed in the upper housing portion 2b, and a horizontal outlet channel section 11b, separated from the inlet channel section 11a by a housing partition 2b and likewise connected at its inlet side to the flow chamber 15. An arrangement thus results in which the horizontal inlet channel section 11a and the likewise horizontal outlet channel section 11b are connected to one another via the flow chamber 15 lying above them.

In a manner previously described, so too in the second embodiment a valve disc 18 is provided in the flow chamber 15 and is movable between an upper, open position and a lower, closed position, in which sealing surfaces 19A, 19B on the valve disc 18, on the one hand, and on a valve seat 20, which is formed on the upper side of the lower housing portion 2a and surrounds the outlet aperture of the vertical channel section 12, on the other hand, come into sealing contact.

Figure 3:
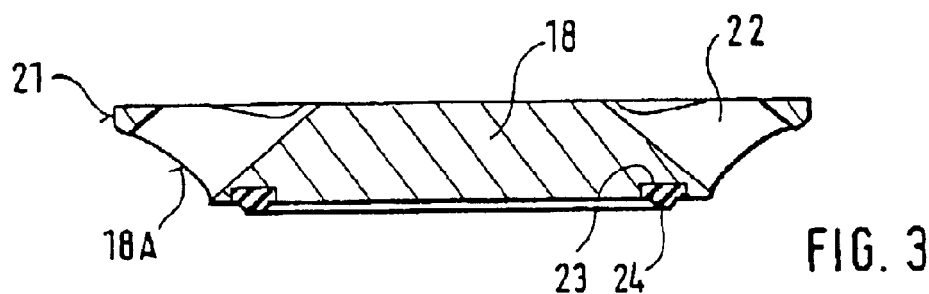
FIG. 3 shows, in longitudinal section, an alternative valve disc for the non-return valve in accordance with FIG. 1, with an inserted packing ring.
Figure 5:
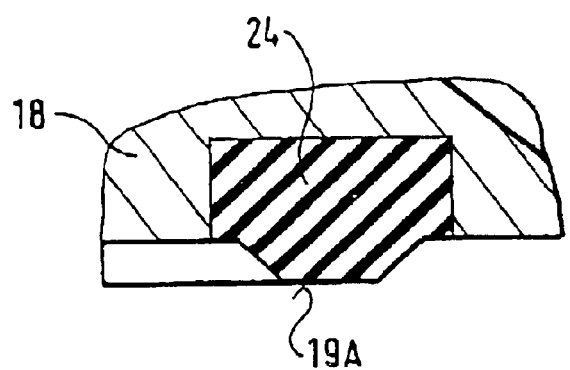
FIG. 5 shows the packing ring inserted into the valve disc in accordance with FIG. 3 in transverse section.
Figure 4:
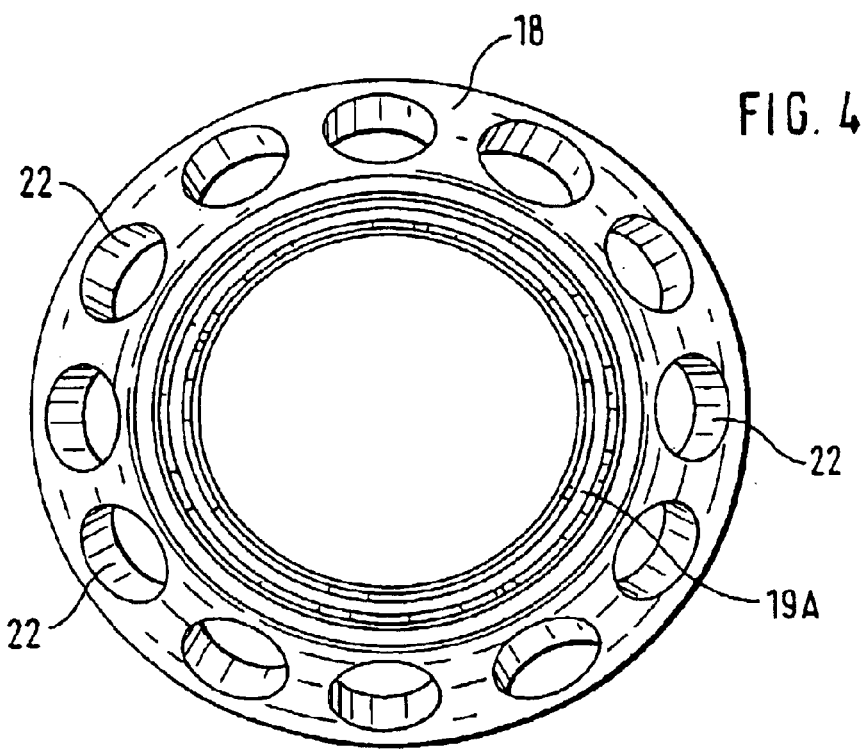
FIG. 4 shows the valve disc in accordance with FIG. 3 in a perspective view.

The valve disc 18 is configured in the same manner as the valve disc 18 that was described in connection with FIGS. 3 to 5 and comprises, in particular, flow bores 22 distributed along its circumference and extending from the inclined external surface 18A of the valve disc 18 to the upper side thereof.

An outflow channel 25 is formed between the lower housing portion 2a and the upper housing portion 2b, surrounds the valve seat 20 and is open towards the outlet channel section 11b.

As is particularly clearly apparent in the longitudinal section in accordance with FIG. 6, the outflow channel 25 is milled into the lower housing portion 2a as a channel open towards the flow chamber 15, the outflow channel 25 possessing a comparatively shallow depth at its end facing towards the valve inlet side (position X), this depth increasing towards the outlet channel section 11b (see broken lines). It is thus apparent in the sectional views in accordance with FIGS. 8 and 9 that the outflow channel 25 possesses, in its middle region viewed in the longitudinal direction of the valve, a significantly greater depth than at its end on the inlet side, and FIG. 6 shows that it possesses its maximum depth at the transition to the outlet channel section. Fluid can flow down through this outflow channel 25 into the outlet channel section 2b.

The functioning of the non-return valve 1 is the same as was described with reference to the first embodiment. In order to avoid repetitions, the relevant statements are incorporated here by way of reference.

Figure 10:
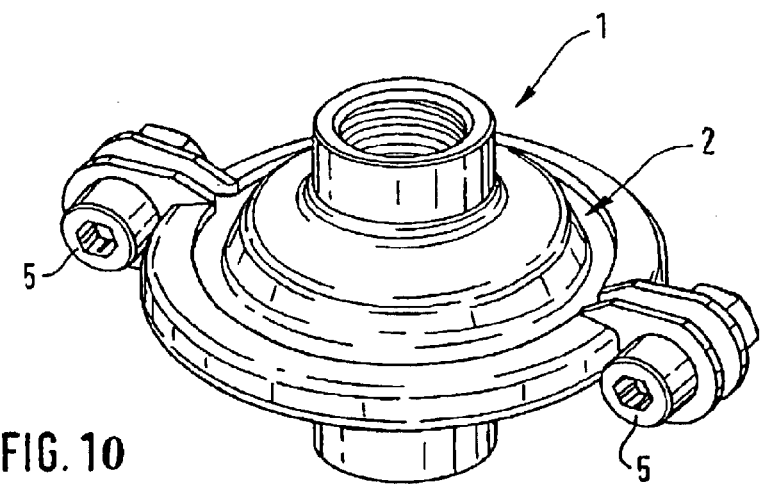
FIG. 10 shows a third embodiment of a non-return valve according to the invention in a perspective view.
Figure 11:
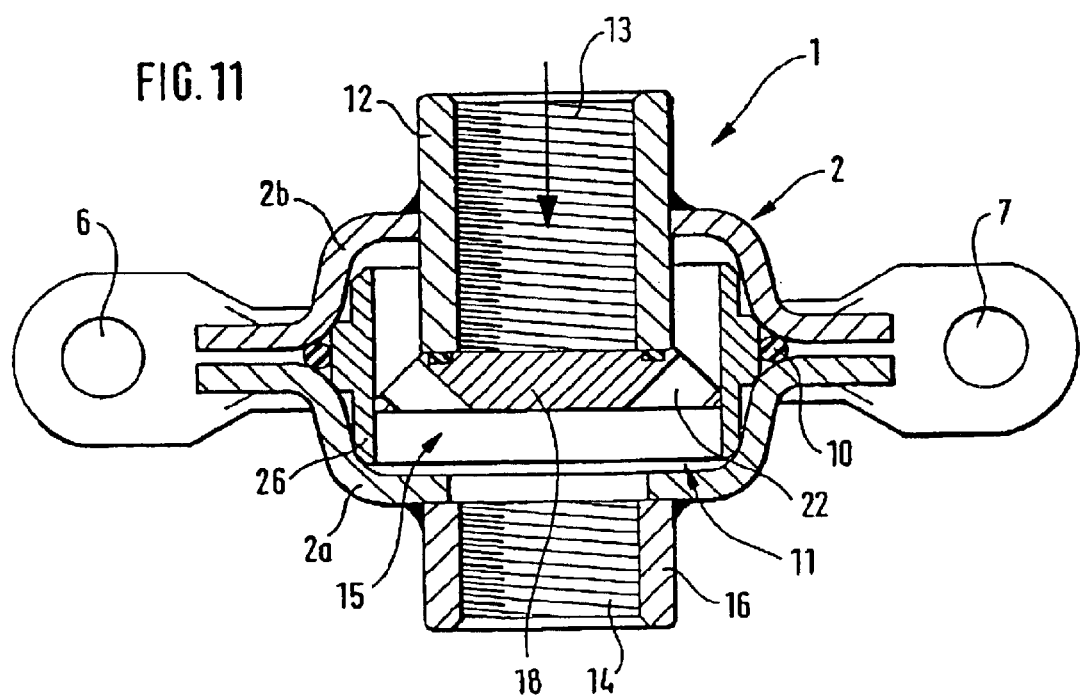
FIG. 11 shows the non-return valve in accordance with FIG. 10 in longitudinal section.

FIGS. 10 and 11 show a third embodiment of a non-return valve 1 according to the invention. This non-return valve 1 corresponds, as far as its basic structure is concerned, to the non-return valve shown in FIGS. 1 to 5, with the proviso that the latter is inverted and the flow passes from top to bottom. Specifically, the non-return valve 1 possesses a valve housing 2 made from stainless steel, which is formed by a lower housing portion 2a and an upper housing portion 2b. The two housing portions 2a and 2b are screwed to one another. For this purpose, connecting flanges 3, 4 having mutually corresponding through bores 6, 7 for connecting screws 5 are provided on the housing portions 2a, 2b in a manner known per se. The gap between the housing portions 2a, 2b is sealed by a packing ring 10.

A flow channel 11 is formed in the valve housing portion 2 and extends through the valve housing 2 in the vertical direction between an inlet aperture 13 in the upper side of the housing and an outlet aperture 14 in the underside of the housing. The flow channel 11 comprises a first channel section 12 formed on the upper housing portion 2b, which comprises the inlet aperture 13, and a second channel section 16 formed on the lower housing portion 2a, together with a flow chamber 15 lying therebetween which is limited laterally by the inner wall of a guide bush 26 set into the valve housing 2. Provided in the flow chamber 15 is a valve disc 18 made from a Teflon material, which is formed in the same manner as the valve disc of the embodiments described previously but is installed in the valve housing 2 in the reversed position of installation, in other words with the sealing surface 19A lying at the top and the guide surface 21 lying at the bottom. The valve disc 18 is movable in vertical direction between a lower, open position and an upper, closed position, in which the sealing surface 19A on the valve disc 18 comes into sealing contact with a corresponding sealing surface 19B of a valve seat 20, which is formed on the underside of the first channel section 19. This vertical movement is guided via the guide surface 21 formed on the lower edge region of the valve disc 18, which comes into contact with the inner surface of the guide bush 26.

In this embodiment, the valve disc 18 is pressed into its upper, closed position as a result of the buoyancy of the fluid which is provided in the flow channel 11. When a fluid under an appropriate pressure flows through the non-return valve 1 from top to bottom, the valve disc 18 is pressed into its lower, closed position, so that the fluid flowing in through the first channel section 12 can flow via the flow chamber 15 and the flow bore 22 to the second channel section 16. The greater the incoming pressure becomes, the further the valve disc 18 lifts away downwards from the valve seat 20.

Alternatively, a valve disc made from stainless steel may also be used. As the density of the stainless steel material is higher than that of the Teflon material, and hence a stainless steel valve disc cannot be brought into its closed position by buoyancy, it is then necessary to support the valve disc 18 by a spring, which pushes the valve disc 18 upwards into its closed position.

I claim:

1. Non-return valve having a valve housing (2) in which is formed a flow channel (11) which possesses a vertical channel section (12), having an inlet aperture (13) and an outlet aperture and having a blocking device for closing the flow channel (11), which blocking device comprises a valve seat (20) surrounding the outlet aperture (14) of the vertical channel section (12) and a valve disc (18), which is movable in the valve housing (2) in a vertical direction between an open position and a closed position in which sealing surfaces (19A, 19B) on the valve disc (18) and valve seat (20) come into sealing contact, wherein the valve disc (18) is movably guided in the valve housing (2) via at least one guide surface (21) provided on the valve disk outer circumference and comprises flow apertures (22) radially outside the valve disk sealing surface (19A), characterized in that the valve disc (18) possesses a diameter that, starting from the valve disk guide surface (21), becomes smaller towards the valve seat (20), forming an inclined external surface (18A), wherein each of the flow apertures forms a separate bore in the valve disk, each of the bores extend from the inclined surface on an inlet side of the valve disk to an outlet side of the valve disk, each of the bores emerge separately from the outlet side of the valve disk so that the separate bores do not intersect within the body of the valve disk.

2. Non-return valve according to claim 1, in which the valve disc (18) is movable in the valve housing (2) between an upper, open position and a lower, closed position, characterized in that the valve disc (18) is urged into its closed position by gravity alone.

3. Non-return valve according to claim 1, characterized in that the valve housing (2) comprises a lower housing portion (2a) with the vertical channel section (12) and the valve seat (20) and an upper housing portion (2b) with a flow chamber (15) in which the valve disc (18) is movably guided.

4. Non-return valve according to claim 3, characterized in that the lower housing portion (2a) and the upper housing portion (2b) are releasably connected to one another and centered relative to one another.

5. Non-return valve according to claim 4, characterized in that the lower housing portion (2a) and the upper housing portion (2b) comprise connecting flanges with mutually corresponding through bores (6, 7) and are screwed to one another.

6. Non-return valve according to claim 4, characterized in that the flow chamber (15) is adjoined at the top by a channel section (16) having a smaller diameter and a conically narrowing transition region (17) is provided therebetween.

7. Non-return valve according to claim 6, characterized in that the angle of the transition region (17) to the horizontal is from 30 to 60°.

8. Non-return valve according to claim 4, characterized in that the bottom of the flow chamber (15) slopes down towards the valve seat (20) at an angle of inclination of from 1.5 to 4°, starting from the wall on which the valve disc (18) is guided.

9. Non-return valve according to claim 3, characterized in that an inlet channel section (11a), particularly a horizontal inlet channel section (11a), is formed in the lower housing portion (2a) and is connected to the flow chamber (15) via the vertical channel section (12).

10. Non-return valve according to claim 9, characterized in that an outlet channel section (11b), in particular a horizontal outlet channel section (11b), is formed in the lower housing portion (2a) and is connected via the flow chamber (15) to the inlet channel section (11a).

11. Non-return valve according to claim 10, characterized in that the inlet channel section (11a) and the outlet channel section (11b) are separated from one another by a housing partition (2a), on the upper side of which the valve seat (20) is formed, at least in part.

12. Non-return valve according to claim 10, characterized in that an outflow channel (25) surrounding the valve seat (20) and open towards the outlet channel section (11b) is formed between the lower housing portion (2a) and the upper housing portion (2b).

13. Non-return valve according to claim 12, characterized in that the outflow channel (25) is formed in the lower housing portion (2a) and is open at its upper side facing towards the flow chamber (15).

14. Non-return valve according to claim 13, characterized in that the outflow channel (25) has a depth that increases from the valve inlet side towards the outlet channel section (11b) so that fluid in the outflow channel (25) automatically flows down into the outlet channel section (11b).

15. Non-return valve according to claim 1, in which the valve disc is vertically movable in the valve housing (2) between a lower, open position and an upper, closed position, characterized in that the valve disc (18) is supported at its underside and pressed into its closed position by a spring element.

16. Non-return valve according to claim 1, in which the valve disc is vertically movable in the valve housing (2) between a lower, open position and an upper, closed position, characterized in that the valve disc consists of Teflon and is pressed into the upper, closed position solely by the buoyancy of the fluid in the flow channel.

17. Non-return valve according to claim 1, characterized in that the sealing surface (19A) is formed on an edge region of the valve disc (18) which is at a distance from the valve seat (20) in the vertical direction.

18. Non-return valve according to claim 1, characterized in that the valve disc (18) narrows conically starting from the guide surface (21).

19. Non-return valve according to claim 18, characterized in that the angle of the conical external surface (18A) to the horizontal is approximately 45°.

20. Non-return valve according to claim 1, characterized in that the valve disc (18) narrows, starting from its guide surface (21), to form a convex external surface (18A).

21. Non-return valve according to claim 1, characterized in that the flow apertures (22) are inclined relative to the axis of the valve disc (18) at an angle of from 30 to 60°.

22. Non-return valve according to claim 1, characterized in that one of the sealing surfaces (19A) is formed on an elastic packing ring (24).

23. Non-return valve according to claim 22, characterized in that the packing ring (24) is inserted into an annular groove (23) on the underside of the valve disc (18) or injected onto the valve disc (18).

24. Non-return valve according to claim 22, characterized in that the packing ring (24) consists of rubber having a Shore hardness of 80.

25. Non-return valve according to claim 22, characterized in that the packing ring (24) tapers towards the sealing surface (19A) and possesses, in particular, a trapezoidal cross section, on the short side of which the sealing surface (19A) is formed.

26. Non-return valve according to claim 1, characterized in that the valve disc (18) and/or the valve housing (2) consists of stainless steel.

27. Non-return valve according to claim 1, characterized in that the surface of the valve disc (18) is polished.

28. Valve disc (18) for use in a non-return valve according to claim 1, which comprises a sealing surface (19A) on an end face, a guide surface (21) formed on the outer circumference of the valve disc (18) and axial flow apertures (22) provided radially outside the sealing surface (19), characterized in that the valve disc (18) possesses a diameter that, starting from its guide surface (21), becomes smaller towards the sealing surface (19A), forming an inclined external surface (18A), and that the flow apertures (22) formed as bores in the valve disc (18) start from the inclined external surface (18A) and converge in the direction facing away from the sealing surface (19A) and are disposed in a uniform distribution over the circumference of the valve disc (18).

29. Valve disc according to claim 25, characterized in that the sealing surface (19A) is provided on the underside of the valve disc and the guide surface (21) is formed on the upper edge region of the valve disc.

30. Valve disc according to claim 28, characterized in that the valve disc (18) narrows conically starting from the guide surface (21).

31. Valve disc according to claim 30, characterized in that the angle of the conical external surface (18A) to the horizontal is approximately 45°.

32. Valve disc according to claim 28, characterized in that the valve disc (18) narrows, starting from its guide surface (21), to form a convex external surface (18A).

33. Valve disc according to claim 28, characterized in that the flow apertures (22) are inclined relative to the axis of the valve disc (18) at an angle of from 30 to 60°.

34. Valve disc according to claim 28, characterized in that one of the sealing surfaces (19A) is formed on an elastic packing ring (24).

35. Valve disc according to claim 34, characterized in that the packing ring (24) is inserted into an annular groove (23) on the underside of the valve disc (18) or injected onto the valve disc (18).

36. Valve disc according to claim 34, characterized in that the packing ring (24) consists of rubber having a Shore harness of 80.

37. Valve disc according to claim 34, characterized in that the packing ring (24) tapers towards the sealing surface (19A) and possesses, in particular a trapezoidal cross section, on the short side of which the sealing surface (19A) is formed.

38. Valve disc according to claim 28, characterized in that the valve disc (18) and/or the valve housing (2) consists of stainless steel.

39. Valve disc according to claim 38, characterized in that the surface of the valve disc (18) is polished.

40. Valve disc according to claim 28, characterized in that it consists, at least for the most part, of polytetrafluoroethylene.

* * * * *